United States Patent
Bhorkar et al.

(10) Patent No.: US 11,477,814 B2
(45) Date of Patent: Oct. 18, 2022

(54) SCHEDULING REQUEST TRANSMISSIONS IN THE UNLICENSED SPECTRUM

(71) Applicant: APPLE INC., Cupertino, CA (US)

(72) Inventors: Abhijeet Bhorkar, Fremont, CA (US); Huaning Niu, San Jose, CA (US); Seau S. Lim, Swindon (GB); Jeongho Jeon, San Jose, CA (US); Qiaoyang Ye, Fremont, CA (US)

(73) Assignee: APPLE INC., Cupertino, CA (US)

( * ) Notice: Subject to any disclaimer, the term of this patent is extended or adjusted under 35 U.S.C. 154(b) by 45 days.

(21) Appl. No.: 17/101,850

(22) Filed: Nov. 23, 2020

(65) Prior Publication Data

US 2021/0076406 A1 Mar. 11, 2021

Related U.S. Application Data

(63) Continuation of application No. 16/092,651, filed as application No. PCT/US2017/027766 on Apr. 14, 2017, now abandoned.

(60) Provisional application No. 62/347,967, filed on Jun. 9, 2016.

(51) Int. Cl.
    *H04W 72/12* (2009.01)
    *H04L 5/00* (2006.01)
    *H04W 74/08* (2009.01)
    *H04W 76/27* (2018.01)
    *H04W 16/14* (2009.01)

(52) U.S. Cl.
    CPC ....... *H04W 72/1284* (2013.01); *H04L 5/0053* (2013.01); *H04W 74/0808* (2013.01); *H04W 74/0833* (2013.01); *H04W 76/27* (2018.02); *H04W 16/14* (2013.01)

(58) Field of Classification Search
    CPC ......... H04W 72/1284; H04W 74/0808; H04W 74/0833; H04W 76/27; H04W 16/14; H04L 5/0053
    See application file for complete search history.

(56) References Cited

U.S. PATENT DOCUMENTS

| | | | |
|---|---|---|---|
| 2014/0050185 A1 | 2/2014 | Hooli et al. | |
| 2014/0112289 A1 | 4/2014 | Kim et al. | |
| 2015/0305065 A1 | 10/2015 | Bai et al. | |
| 2017/0150523 A1* | 5/2017 | Patel | H04W 74/008 |
| 2017/0245302 A1 | 8/2017 | Mukherjee et al. | |

(Continued)

FOREIGN PATENT DOCUMENTS

| | | | | |
|---|---|---|---|---|
| WO | WO-2016072908 A1 * | 5/2016 | | H04W 74/08 |
| WO | 2017148733 A1 | 9/2017 | | |

(Continued)

OTHER PUBLICATIONS

PCT/US2017/027766, International Search Report and Written Opinion, dated Sep. 8, 2017, 18 pages.

(Continued)

*Primary Examiner* — Shailendra Kumar

(57) ABSTRACT

A number of embodiments can describe the operation of a UE in an unlicensed spectrum. Operating a UE in an unlicensed spectrum can include processing a PDCCH transmission provided by an eNodeB to identify a resource for a transmission of the SR message and based on the resource identified in the PDCCH, generating a PUCCH transmission comprising the SR message for the eNodeB.

20 Claims, 8 Drawing Sheets

(56) References Cited

U.S. PATENT DOCUMENTS

2017/0325216 A1    11/2017   Nogami et al.
2019/0342915 A1*   11/2019   Kim .................... H04W 74/002

FOREIGN PATENT DOCUMENTS

WO    WO-2017148733 A1 *  9/2017
WO       2017213751 A1    12/2017

OTHER PUBLICATIONS

U.S. Appl. No. 16/092,651, Non-Final Office Action, dated Jul. 23, 2020, 10 pages.

* cited by examiner

SCHEDULING REQUEST TRANSMISSIONS IN THE UNLICENSED SPECTRUM

RELATED APPLICATIONS

This application is a continuation of U.S. non-provisional patent application Ser. No. 16/092,651, filed Oct. 10, 2018, which is a national phase application of International patent application no. PCT/US2017/027766, filed Apr. 14, 2017, which claims the benefit of U.S. provisional patent application No. 62/347,967 filed Jun. 9, 2016, each of which is hereby incorporated by reference herein in its entirety.

TECHNICAL FIELD

The present disclosure relates to scheduling request (SR) transmissions. In particular, the present disclosure relates to SR transmission in the unlicensed spectrum.

DETAILED DESCRIPTION OF PREFERRED EMBODIMENTS

Figure 1:
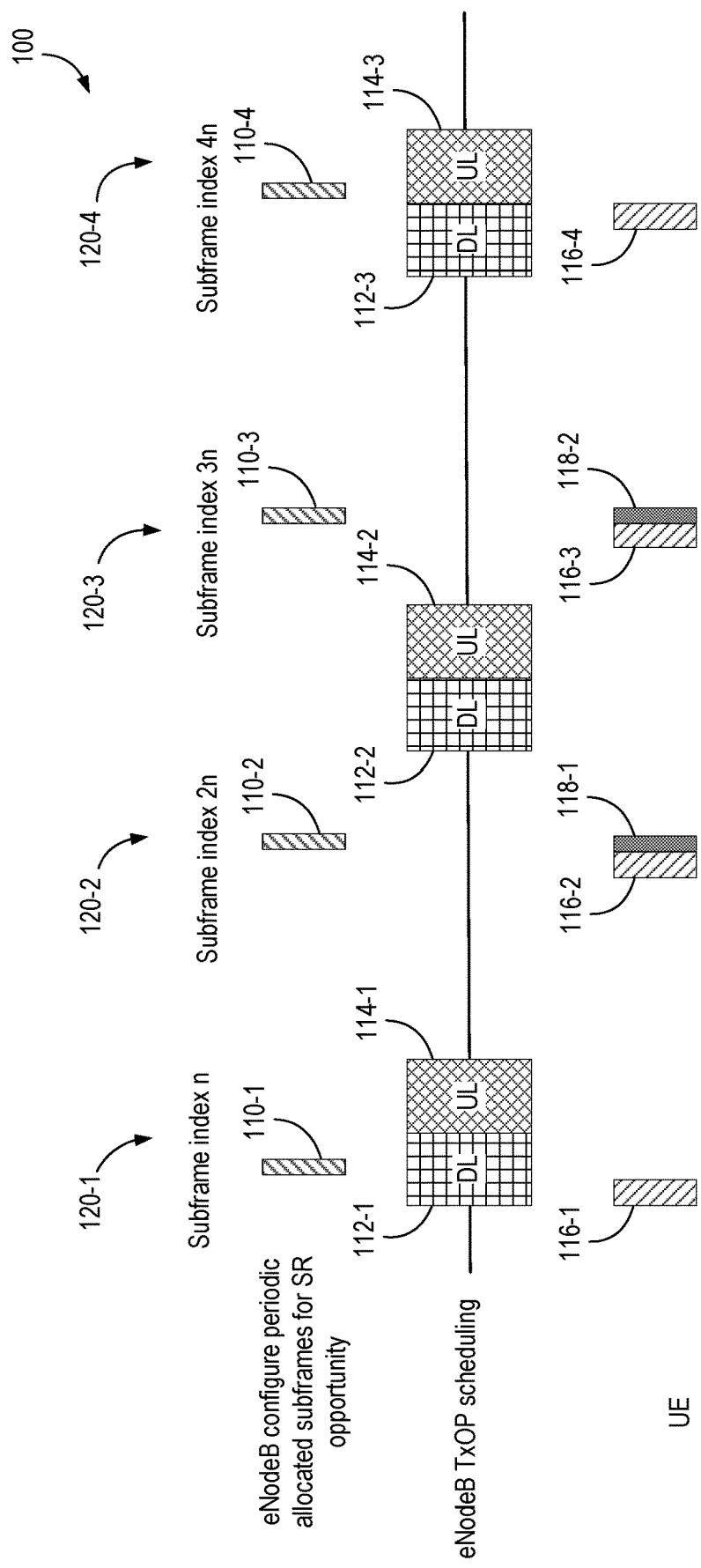
FIG. 1 is a timing diagram illustrating SR transmissions according to one embodiment.

Wireless mobile communication technology uses various standards and protocols to generate and/or transmit data between a base station and a wireless communication device. Wireless communication system standards and protocols can include, for example, a 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wireless Local Area Network (WLAN) or Wi-Fi. In 3GPP radio access networks (RANs) in LTE systems, a base station may include Evolved Universal Terrestrial Radio Access Network (E-UTRAN) Node B (also commonly denoted as evolved Node B, enhanced Node B, eNodeB, or eNB) and/or Radio Network Controllers (RNCs) in the E-UTRAN, which communicate with a wireless communication device, known as user equipment (UE). In LTE networks, the E-UTRAN may include a plurality of eNodeBs and may communicate with the plurality of UEs. LTE networks include a radio access technology (RAT) and core radio network architecture that can provide high data rate, low latency, packet optimization, and improved system capacity and coverage.

The examples described herein are related to LTE operations in an unlicensed spectrum, such as in MulteFire LTE deployment. The wireless traffic growth may lead to a need for data rate improvement. With mature physical layer techniques, further improvement in the spectral efficiency may be marginal. The scarcity of licensed spectrum in low frequency bands can result in a deficit in the data rate boost. Thus, the operation of LTE systems in unlicensed spectrum can be used to improve data rates.

An enhancement for LTE in 3GPP release 13 has been to enable operation with focus on downlink (DL) transmissions in the unlicensed spectrum via Licensed-Assisted Access (LAA), which may expand the system bandwidth by utilizing the flexible carrier aggregation (CA) framework introduced by the LTE-advanced system. Potential LTE operations in unlicensed spectrum can include, but are not limited to, the uplink (UL) transmission of the CA based LAA systems, LTE operation in the unlicensed spectrum via dual connectivity (DC), and the standalone LTE system in the unlicensed spectrum, where LTE based technology solely operates in unlicensed spectrum without requiring an "anchor" in licensed spectrum (e.g., MulteFire). MulteFire can combine the performance benefits of LTE technology with the simplicity of Wi-Fi-like deployments. MulteFire is a technology component that can be used to meet the ever-increasing wireless traffic. A number of embodiments utilize a standalone LTE system in unlicensed spectrum including but not limited to MulteFire, a next release LAA systems, which enables UL operation, 5G unlicensed systems, and/or DC based LAA systems.

In some embodiments, a scheduling request (SR) can be transmitted utilizing the unlicensed spectrum utilizing a MulteFire principles. An SR can be used by a UE to request for UL resources via UL scheduling when the UE has UL traffic to transmit to an eNodeB (e.g., a next generation node in 5G). In LTE, an SR can be transmitted in a physical uplink control channel (PUCCH) and/or via a physical random access channel (PRACH).

For an SR transmitted via a PUCCH, the SR resource configuration is send to UE—through an SR configuration structure. An example of an SR configuration structure is provided by the pseudocode:

```
SchedulingRequestConfig ::=         Choice {
    release                             NULL,
    setup                               SEQUENCE {
        sr-PUCCH-ResourceIndex              INTEGER (0 . . 2047),
        sr-ConfigIndex                      INTEGER (0 . . 157),
        dsr-TransMax                        ENUMERATED {
                                                n4, n8, n16, n32, n64,
                                                spare3,
    spare 2, spare1}
    }
}
```

SchedulingRequestConfig( ) is an object that can be used to configure an SR. The SchedulingRequestConfig( ) object can receive one or more variables. The one or more variables can include sr-PUCCH-ResourceIndex, sr-ConfigIndex, and TransMax. The variable sr-PUCCH-ResourceIndex can indicates that a UE configuring the SR has specific frequency domain resources. The variable sr-ConfigIndex can convey time domain resources of a PUCCH which carriers SR. An eNodeB can control the maximum number SR transmissions from each UE on PUCCH using the parameter dsr-TransMax.

SR periodicities of 1, 2, 5, 10, 20, 40, and 80 ms are supported in LTE rel-9. Different SR periodicities can be used to support different quality of service (QoS) requirement. For example, a longer delay can be expected for a longer SR periodicity. A higher number of resources can be reserved for SR transmissions having a shorter SR periodicity.

SRs sent over a PUCCH can be referred to as dedicated SR (DSR). A DSR can refer to dedicated physical channel resources that are provided (e.g., scheduled) for transmitting an SR. In some embodiments, a UE can provide an SR via a PRACH if a SR via PUCCH (e.g., DSR) is not configured. In some examples, the UE can provide an SR via a PRACH only if a SR via PUCCH (e.g., DSR) is not configured.

In MulteFire, periodic non-anchored subframes can be introduced for PRACH transmissions. Periodic non-anchored subframes can be defined as a set of UL subframes which are periodically configured for SR transmissions. In some examples, non-anchored subframes can be overwrite by eNB to be used for non SR transmissions.

UL subframes can also be dynamically configured by an eNodeB subframe by subframe. SRs can be transmitted within periodic non-anchor subframes via PRACH.

UL control signals can be dynamically transmitted via an short PUCCH (sPUCCH) format consisting of the last n symbols (n=4 symbols) of a subframe where the first 14-n are not used for UL transmissions. UL control signals can also be transmitted via a long enhanced PUCCH (ePUCCH) which can triggered by an eNodeB. The UL control signals can be frequency domain multiplexed with a PUSCH. An ePUCCH is one subframe including 12, 13 or 14 symbols depending on starting and ending symbol configuration by an eNodeB.

The SRs can be transmitted on an sPUCCH that can consist of 4 symbols Providing dedicated resources for transmission of DSR in PUCCH can be difficult due to the dynamic presence of sPUCCH and/or ePUCCH.

In some embodiments, DSRs and/or SRs can be transmitted utilizing non-anchor subframes. DSRs and/or SRs can also be transmitted utilizing sPUCCHs and/or ePUCCHs.

Configuring SR resource using periodic non-anchor subframes can be an extension from LTE. The sr-PUCCH-ResourceIndex can configure the UE with frequency domain resources (e.g., interlace, sequence). The sr-ConfigIndex can configure a periodicity of SRs, a system frame number (SFN), and/or a subframe index.

For SR transmission, a UE can perform a category (CAT) 4 listen before talk (LBT) before transmitting the SR on a non-anchor subframe. If the UE successfully performs the CAT 4 LBT early, the UE can generate and/or transmit the SR. If the UE successfully performs the CAT 4 LBT early, the UE can defer (e.g., self defer) to the non-anchor subframe and perform a one shot LBT before transmitting the SR. As another embodiment, the UE can perform a single interval LBT instead of CAT 4 LBT before transmitting the R.

Given a one shot LBT operation of the PRACH transmission, the periodic non-anchored subframe periodicity may not be short. That is, the periodic non-anchored subframe periodicity may be longer than the periodicity of a DRS. In some embodiments, performing a one shot LBT before transmitting a SR in periodic non-anchored subframes may not meet QoS requirements.

Due to the dynamic nature of scheduling ePUCCH/sPUCCH, a floating grant of RRC configured periodic SR resource can be implemented. Instead of configuring a time domain resource using a SFN and/or a subframe index, the SR resources can be configured using a burst ID and/or a UL subframe offset. The frequency domain resource configuration can remain the same as indicated by sr-PUCCH-ResourceIndex. In one embodiment, an UL subframe offset can be configured by radio resource control (RRC). The UL subframe offset can also be configured by a physical downlink control channel scrambled by CC-RNTI (cPDCCH), where the cPDCCH utilizes a PDCCH format 1C, scrambled with CC-RNTI. If configured by a cPDCCH, the eNodeB can indicate which subframes the UE can use to transmit a sounding reference signal (SRS) with respect to the cPDCCH. If the offset is greater than the quantity of UL subframes, then a UE may refrain from transmitting the SRS.

In cPDCCH a 2 bits burst ID can be used to handle the error scenario of option two cross burst scheduling. The two bits can be reused to partition UEs into multiple groups. With N bits, 2^N groups can be formed. In one embodiment, one UE can be assigned multiple groups.

CPDCCH can provide the a burst-ID. UEs within a group that is associated with burst-ID can transmit SRs on the sPUCCH and/or ePUCCH within the transmission opportunity (TxOP) that is associated with the burst-ID.

Both the sPUCCH and ePUCCH can be used for SR transmission. In one embodiment, only sPUCCH is configured for SR transmission.

The UE can monitor the cPDCCH transmissions before transmitting an SR. The following table show the configurations applied to configure SR.

TABLE 1

| SR Configuration Index – MF I_sr | SR periodicity – MF (burst) | SR subframe offset |
|---|---|---|
| 0-4 | 1 | I_sr |
| 5-9 | 2, offset 0 (SR transmission on burst ID 0, 2) | I_sr – 5 |
| 10-14 | 2, offset 1 (SR transmission on burst ID 1, 3) | I_sr – 10 |
| 15-19 | 4, offset 0 (SR transmission on burst ID 0) | I_sr – 15 |
| 20-24 | 4, offset 1 (SR transmission on burst ID 1) | I_sr – 20 |
| 25-29 | 4, offset 2 (SR transmission on burst ID 2) | I_sr – 25 |
| 30-34 | 4, offset 3 (SR transmission on burst ID 3) | I_sr – 30 |

The SR configuration index (e.g., SR Configuration Index—MuLTEfile (ME) I_sr) can be an index that can be provided via the cPDCCH to convey an SR periodicity (SR periodicity—MF (burst)) and/or an SR sR subframe offset. The UE can retain a local copy of table 1 and can use table 1 to configure an SR transmission and/or an uplink transmission. For example, if the SR configuration index provided to the UE is 11, then the UE can configure an SR transmission with a 2 burst periodicity offset by 1 such that the SR transmission can be transmitted on burst ID 1 and 3. The UE can also configure an SR transmission with subframe offset of 1.

When I_sr (e.g., SR configuration index) in one particular burst is larger than the total UL subframes scheduled in the burst, then the SR transmission on I_sr can be dropped. For higher QoS traffic, a low I_sr is preferred (e.g., I_sr=0 corresponds to the highest QoS). In another embodiment, the UE can configure a DSR transmission with both periodic non-anchor subframes and also sPUCCH and/or ePUCCH.

In some examples, table 2 can be used in place of table 1.

TABLE 2

| SR configuration Index $I_{SR}$ | SR periodicity (ms) $SR_{PERIODICITY}$ | SR subframe offset $N_{OFFSET, SR}$ |
|---|---|---|
| 0-4 | 5 | $I_{SR}$ |
| 5-14 | 10 | $I_{SR} - 5$ |
| 15-34 | 20 | $I_{SR} - 15$ |
| 35-74 | 40 | $I_{SR} - 35$ |
| 75-154 | 80 | $I_{SR} - 75$ |
| 155-156 | 2 | $I_{SR} - 155$ |
| 157 | 1 | $I_{SR} - 157$ |

Reference is now made to the figures, in which like reference numerals refer to like elements. For clarity, the first digit of a reference numeral indicates the figure number in which the corresponding element is first used. In the following description, numerous specific details are provided for a thorough understanding of the embodiments disclosed herein. However, those skilled in the art will recognize that the embodiments described herein can be practiced without one or more of the specific details, or with other methods, components, or materials. Further, in some cases, well-known structures, materials, or operations are not shown or described in detail in order to avoid obscuring aspects of the embodiments. Furthermore, the described features, structures, or characteristics may be combined in any suitable manner in one or more embodiments.

FIG. 1 is a timing diagram 100 illustrating SR transmissions according to one embodiment. The timing diagram 100 can include subframes 120-1 (*n*), 120-2 (2*n*), 120-3 (3*n*), and 120-4 (4*n*), referred to herein as subframes 120. The timing diagram 100 can also include periodic allocated subframes 110-1, 110-2, 110-3, and 110-4, referred to generally as periodic allocated subframes 110.

The periodic allocated subframes 110 can correspond with the subframes 120. For example, the periodic allocated subframe 110-1 can correspond to subframe 120-1, the periodic allocated subframe 110-2 can correspond to subframe 120-2, the periodic allocated subframe 110-3 can correspond to subframe 120-3, and the periodic allocated subframe 110-4 can correspond to subframe 120-4. The periodic allocated subframes 110 can be subframes in which a UE can transmit an SR. The periodic allocated subframes 110 can be configured by a eNodeB.

The timing diagram 100 also includes scheduled DL subframes 112-1, 112-2, and 112-3, referred to as DL subframes, and UL subframes 114-1, 114-2, and 114-3, referred to generally as UL subframes 114. The DL subframes 112 and the UL subframes 114 can be configured by the eNodeB given a TxOP.

If UE does not detect cPDCCH, UE can perform a CAT-4 LBT procedure 116-1 before transmitting an SR in the periodic allocated subframe 110-1. The LBT procedure 116-1 can be performed unsuccessfully due to transmissions in the DL subframe 112-1 or other interference 112-1. As such, the UE does not transmit an SR. The UE can perform a LBT procedure 116-2 before transmitting an SR in the periodic allocated subframe 110-2. The LBT procedure 116-1 can be performed successfully. As such, the UE can transmit a SR 118-1. The UE can perform a LBT procedure 116-3 before transmitting an SR in the periodic allocated subframe 110-3. The LBT procedure 116-3 can be performed successfully. As such, the UE can transmit a SR 118-2. A UE can perform a LBT procedure 116-4 before transmitting an SR in the periodic allocated subframe 110-4. The LBT procedure 116-1 can be performed unsuccessfully due to transmissions in the DL subframe or other interference 112-3. As such, the UE does not transmit an SR.

Figure 2:
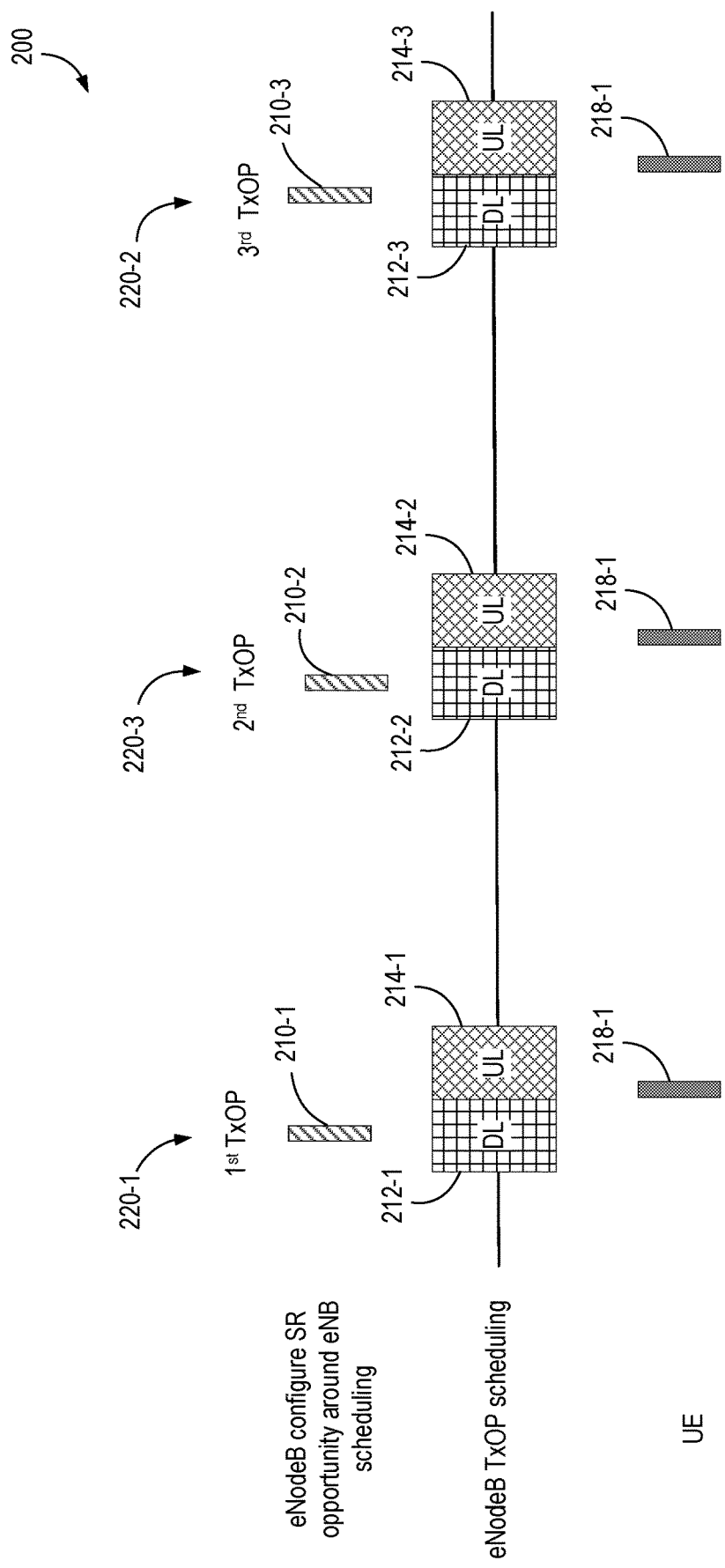
FIG. 2 is a timing diagram illustrating SR transmissions according to one embodiment.

FIG. 2 is a timing diagram 200 illustrating SR transmissions according to one embodiment. The timing diagram 200 can include TxOP 220-1, 220-2, and 220-3, referred to generally as TxOP 220. The timing diagram 200 can differentiate from the timing diagram 100 in that the timing diagram utilizes subframe indexes 120 while the timing diagram 200 utilizes TxOP 220. The timing diagram 200 utilizes TxOP 220-1 because MulteFire adopted a flexible frame structure where any subframe can be a DL subframe or an UL subframe. The eNodeB generates a schedule after the eNodeB acquires the TxOP. Using TxOP, the eNodeB LBT success rate and/or eNodeB scheduling can be used to generate the time index. An eNodeB can configure SR opportunities 210-1, 210-2, and 210-3, referred to as SR opportunities 210, in association with TxOP 220-1, 220-2, and 220-3.

The eNodeB can schedule DL subframes 212-1, 212-2, and 212-3 within a TxOP. The eNodeB can also schedule UL subframes 214-1, 214-2, and 214-3 within a TxOP. The UE can transmit the SRs 218-1, 218-2, and 218-3, referred to as SRs 218, without performing a LBT procedure if the eNodeB ensures a 16 us gap between a DL and/or UL transmission, and if the eNodeB configured the UE with no LBT for sPUCCH. The UE can transmit the SRs 218-2 and 218-3 with a one shot (25 us) LBT if the eNodeB configure the UE with one shot LBT. As shown in the timing diagram 200, the SRs 218 can be transmitted at the subframe around the SR opportunities 210, depending on cPDCCH scheduling. The SRs 218-1 can be transmitted in special subframes 212.

Figure 3:
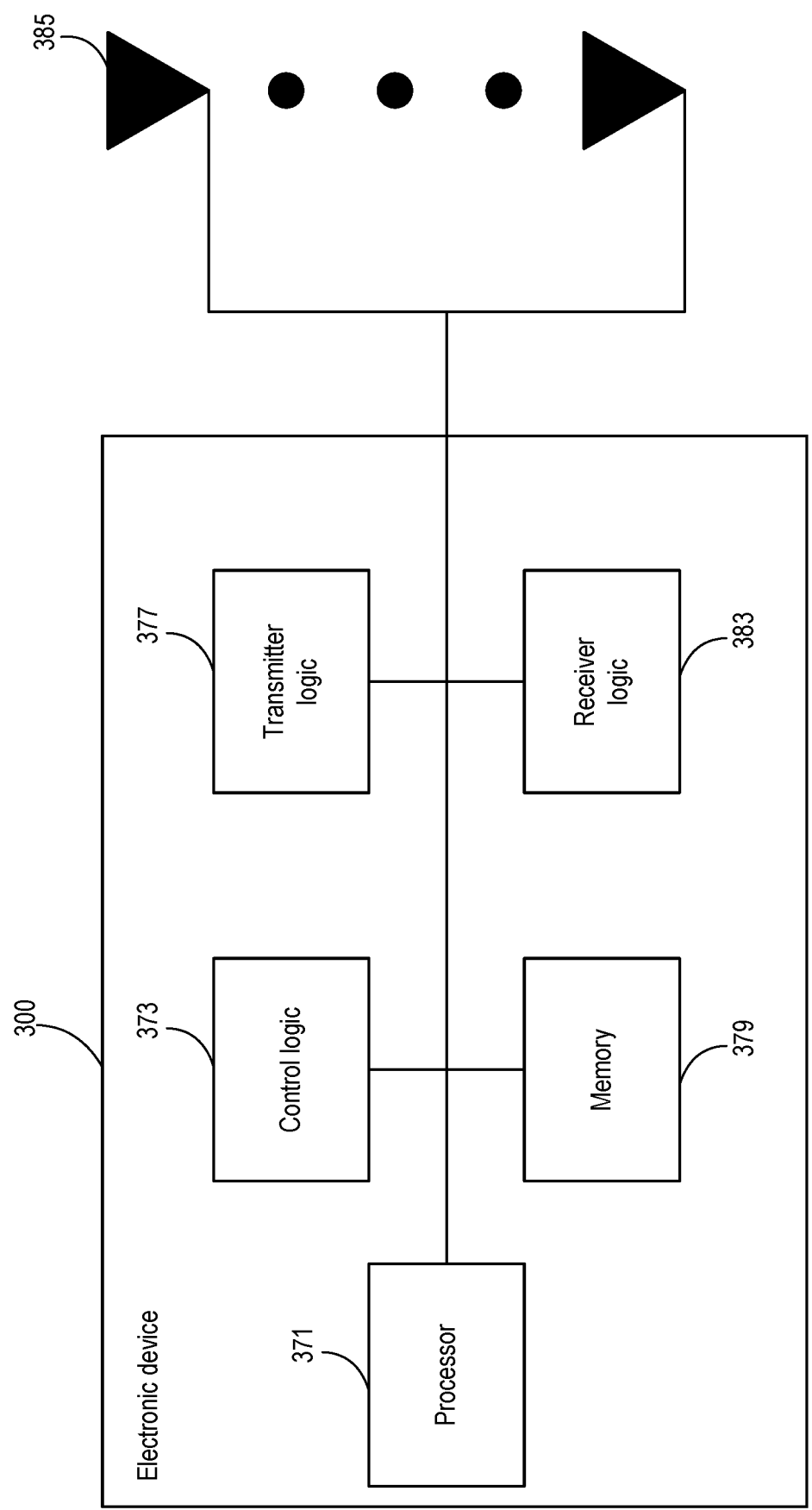
FIG. 3 is a block diagram illustrating electronic device circuitry that may be eNodeB circuitry, user equipment (UE) circuitry, network node circuitry, or some other type of circuitry according to one embodiment.

FIG. 3 is a block diagram illustrating electronic device circuitry that may be eNodeB circuitry, user equipment (UE) circuitry, network node circuitry, or some other type of circuitry according to one embodiment. FIG. 3 illustrates an electronic device 300 that may be, or may be incorporated into or otherwise part of, an eNodeB, a UE, or some other type of electronic device in accordance with various embodiments. Specifically, the electronic device 300 may be logic and/or circuitry that may be at least partially implemented in one or more of hardware, software, and/or firmware. In embodiments, the electronic device logic may include radio transmit/transmitter logic (e.g., a transmitter logic 377) and receive/receiver logic (e.g., a receiver logic 383) coupled to a control logic 373 and/or a processor 371. In embodiments, the transmit/transmitter and/or receive/receiver logic may be elements or modules of transceiver logic. The transmitter logic 377 and the receiver logic 383 may be housed in separate devices. For example, the transmitter logic 377 can be incorporated into a first device while the receiver logic 383 is incorporated into a second device, or the transmitter logic 377 and the receiver logic 383 can be incorporated into a device separate from a device including any combination of the control logic 373, a memory 379, and/or the processor 371. The electronic device 300 may be coupled with or include one or more antenna elements 385 of one or more antennas. The electronic device 300 and/or the components of the electronic device 300 may be configured to perform operations similar to those described elsewhere in this disclosure.

In embodiments where the electronic device 300 implements, is incorporated into, or is otherwise part of a UE and/or an eNodeB, or device portion thereof, the electronic device 300 can transmit a SR. The processor 371 may be coupled to the first receiver and the first transmitter. The memory 379 may be coupled to the processor 371 having control logic instructions thereon that, when executed, generate, encode, receive, and/or decode a SR.

In embodiments where the electronic device 300 receives data, generates data, and/or transmits data to/from a UE to implement a downlink signal including the SR, the processor 371 may be coupled to a receiver and a transmitter. The memory 379 may be coupled to the processor 371 having control logic 373 instructions thereon that, when executed, may be able to transmit the SR.

As used herein, the term "logic" may refer to, be part of, or include an application specific integrated circuit (ASIC), an electronic circuit, the processor 371 (shared, dedicated, or group), and/or the memory 379 (shared, dedicated, or group) that execute one or more software or firmware programs, a combinational logic circuit, and/or other suitable hardware components that provide the described functionality. Specifically, the logic may be at least partially implemented in, or an element of, hardware, software, and/or firmware. In some embodiments, the electronic device logic may be implemented in, or functions associated with the logic may be implemented by, one or more software or firmware modules.

Figure 4:
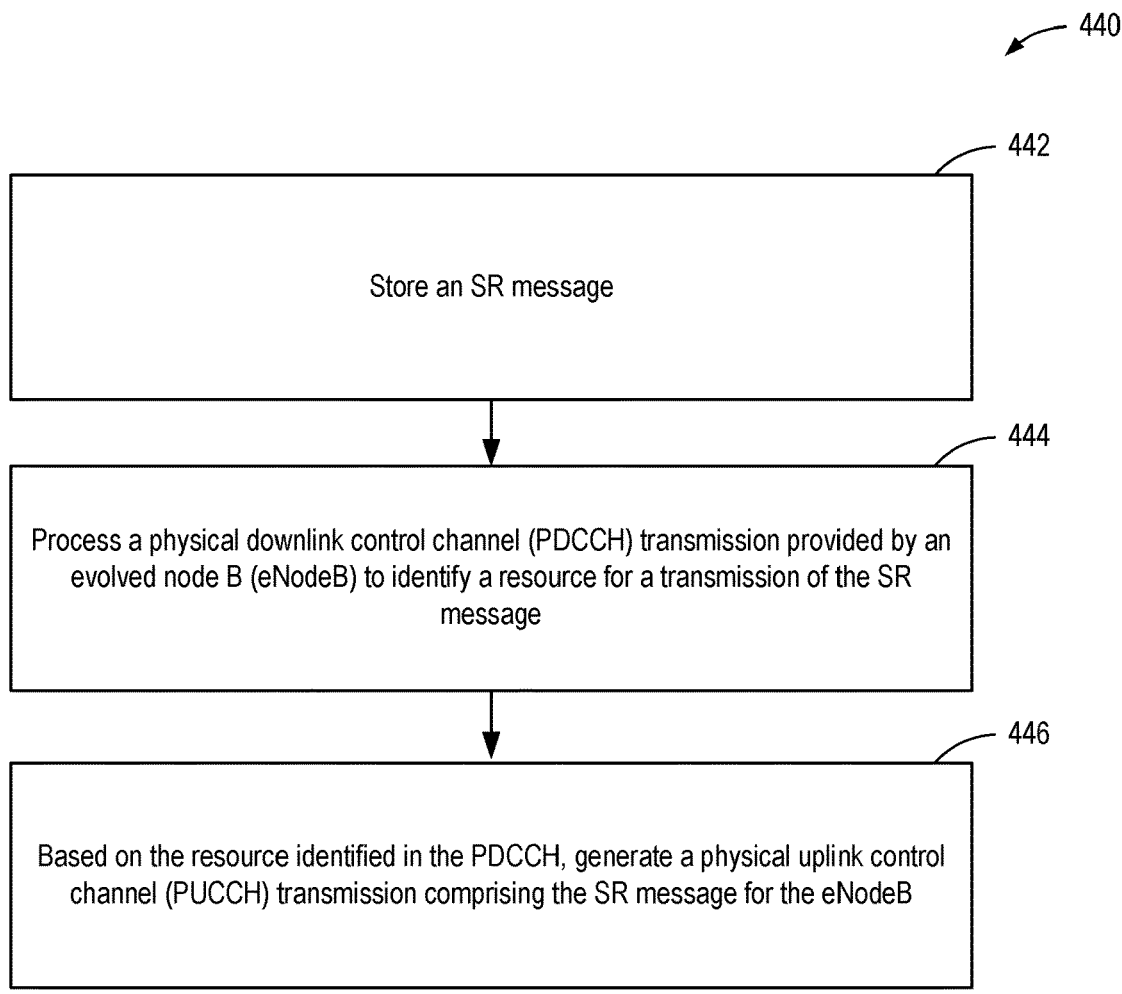
FIG. 4 is a block diagram illustrating a method for SR transmission in the unlicensed spectrum according to one embodiment.

FIG. 4 is a block diagram illustrating a method 440 for configuring a quantity of repetitions of a DL transmission based on an ENRR according to one embodiment. The method 440 can include storing 442 a message, processing 444 a PDCCH transmission provided by an eNodeB to identify a resource for a transmission of the SR message, and based on the resource identified in the PDCCH, generating 446 a PUCCH transmission comprising the SR message for the eNodeB.

The processing process the PDCCH transmission further comprises processing a cPDCCH. Wherein the PUCCH transmission spans 4 symbols spanning one of the interlaces of block-interleaved frequency division multiple access (B-IFDMA) structure. Wherein the generating the PUCCH transmission further comprises generating a sPUCCH transmission. Wherein the sPUCCH transmission is time multiplexed with a PUSCH transmission.

Figure 5:
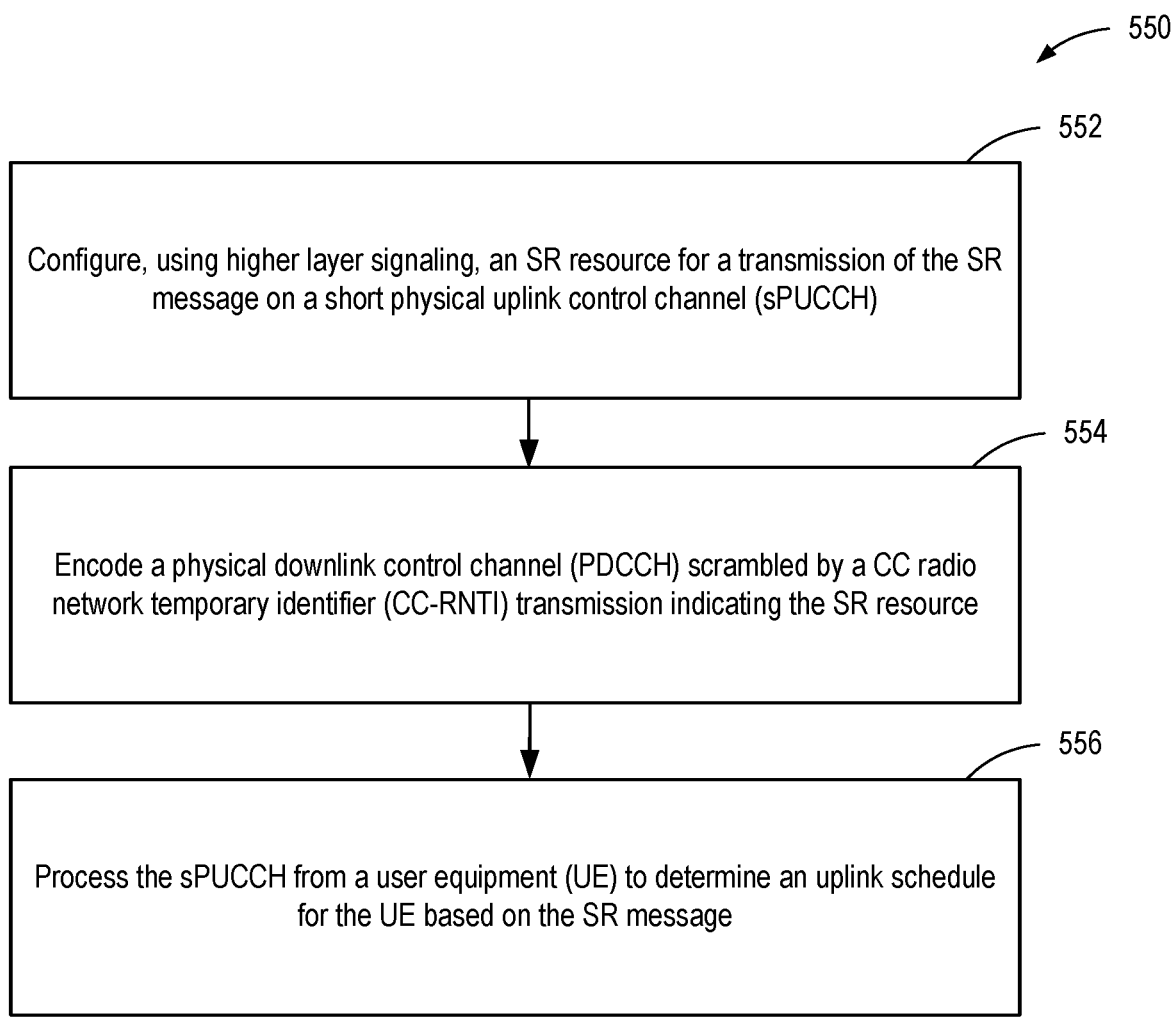
FIG. 5 is a block diagram illustrating a method for SR transmission in the unlicensed spectrum according to one embodiment.

FIG. 5 is a block diagram illustrating a method 550 for generating an ENRR according to one embodiment. The method 550 can include configuring 552 using higher layer signaling, an SR resource for a transmission of the SR message on a short physical uplink control channel (sPUCCH), encoding 554 a PDCCH scrambled by a CC-RNTI transmission indicating the SR resource, and process the sPUCCH from a UE to determine an uplink schedule for the UE based on the SR message.

The method 550 further comprises configuring the SR resource comprising a burst ID. The method 550 is further comprises configuring the SR resource comprising an UL subframe offset. Wherein the UL subframe offset is configured by a RRC configuration. Wherein the UL subframe offset is configured by a cPDCCH. The method 550 further comprises configuring the SR resource comprising a burst ID and an UL subframe offset. Wherein the SR resource is generated by an RRC layer.

Figure 6:
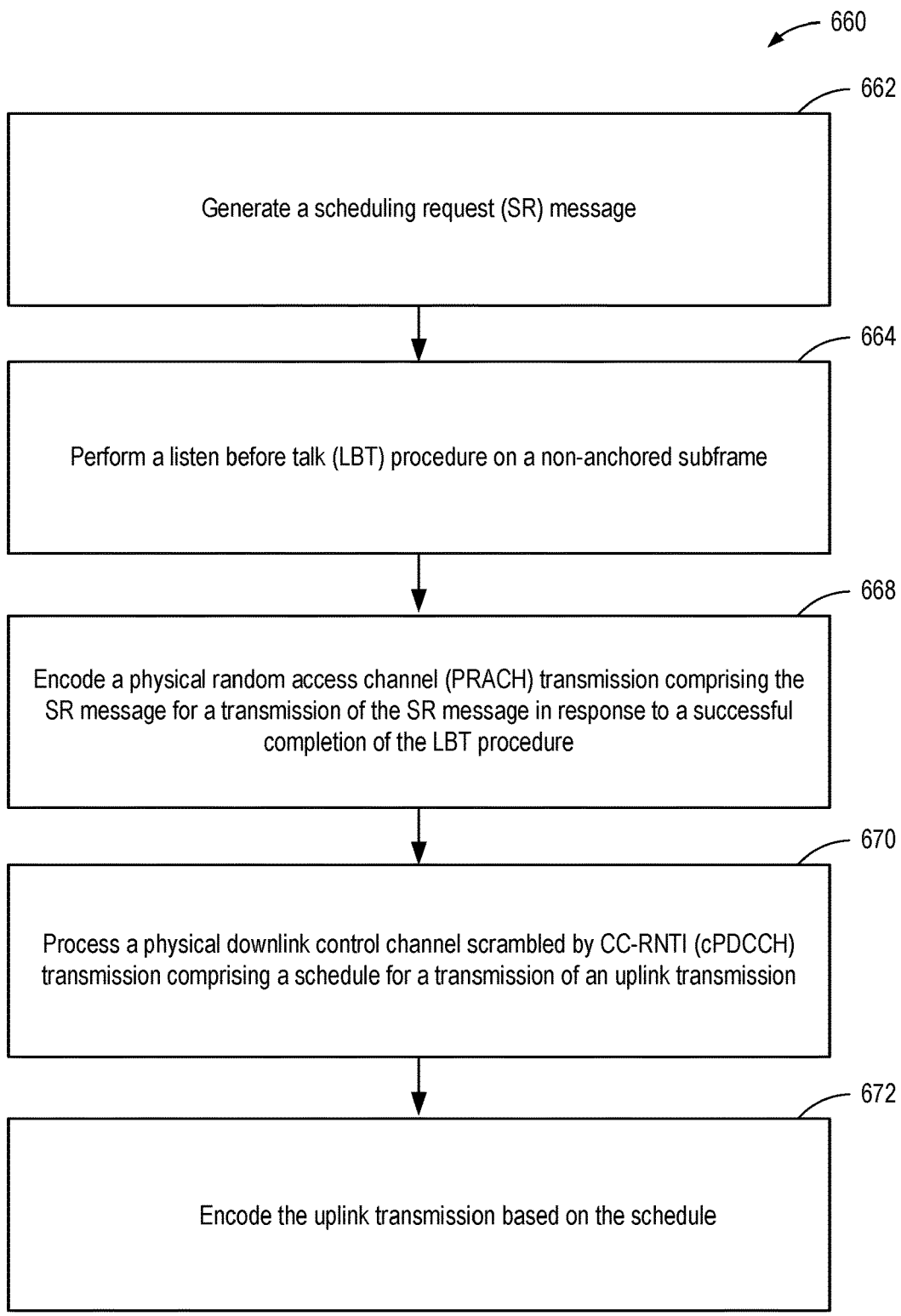
FIG. 6 is a block diagram illustrating a method for SR transmission in the unlicensed spectrum according to one embodiment.

FIG. 6 is a block diagram illustrating a method 660 for implementing a UCG according to one embodiment. The method 660 can include generating 662 a SR message, performing 664 a LBT) procedure on a non-anchored subframe, encoding 668 a PRACH transmission comprising the SR message for a transmission of the SR message in response to a successful completion of the LBT procedure, processing 670 a cPDCCH transmission comprising a schedule for a transmission of an uplink transmission, and encoding the uplink transmission based on the schedule.

The method 660 comprising performing the LBT procedure further comprises performing the LBT procedure repetitively until the successful completion of the LBT procedure. Performing the LBT procedure further comprise performing a CAT 4 LBT procedure on non-anchor subframe. Performing the LBT procedure further comprise performing a one shot LBT procedure when cPDCCH is detected, and the LBT procedure is configured to be one shot LBT procedure by a higher layer. Performing the LBT procedure further comprise performing a no LBT procedure when cPDCCH is detected, and the LBT procedure is configured to be no LBT procedure by a higher layer followed by 16 us DL/UL gap.

Encoding the PRACH transmission comprising the SR message for the transmission of the SR message in response to the successful completion of the LBT procedure further comprise encoding the PRACH transmission comprising the SR message for the transmission of the SR message in response to the successful completion of one shot LBT procedure. Wherein the uplink transmission is provided via a sPUCCH for SR transmissions.

Figure 7:
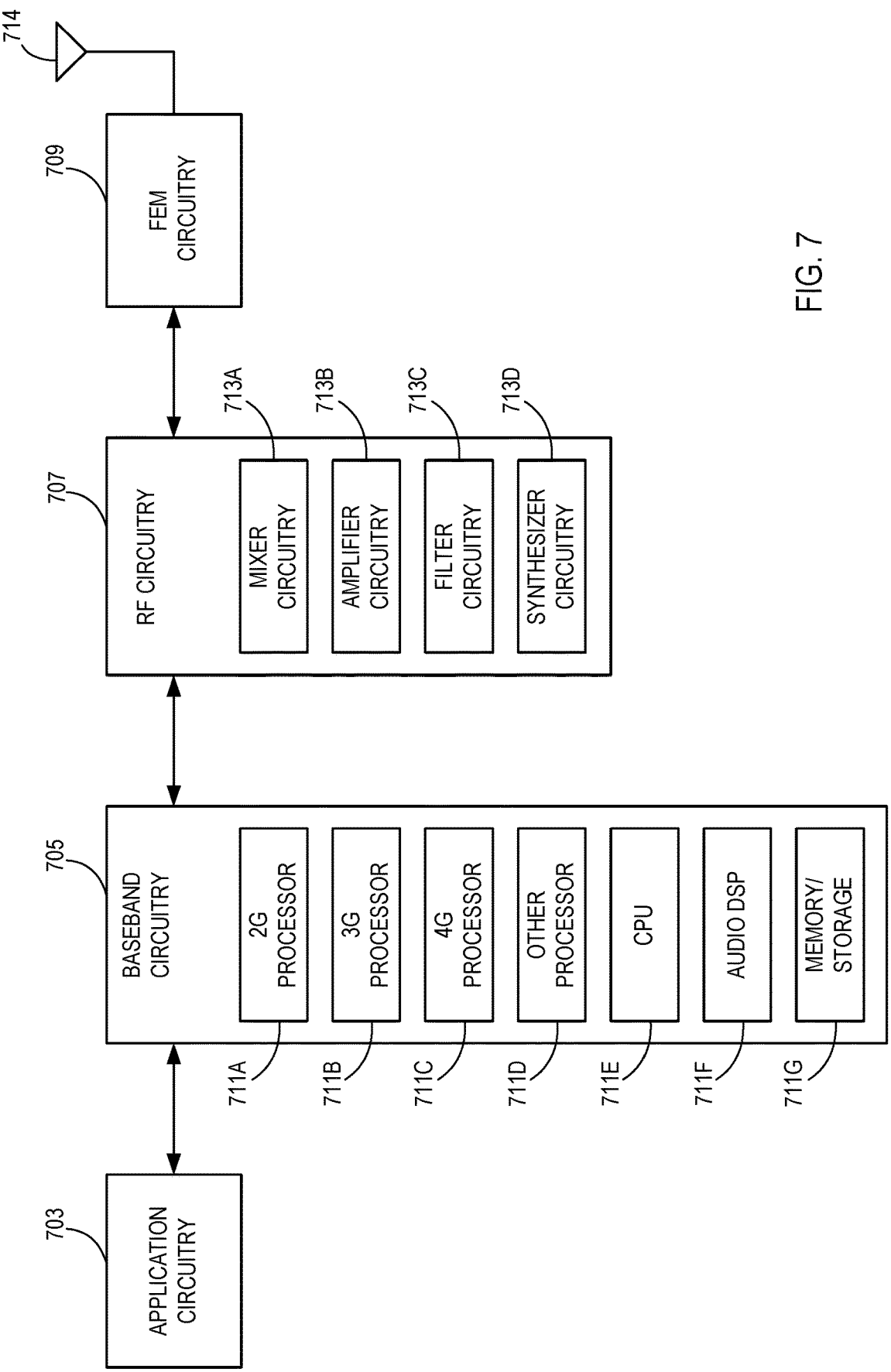
FIG. 7 is a block diagram illustrating components of a device according to one embodiment.

FIG. 7 is a block diagram illustrating components of a device according to one embodiment. In some embodiments, the device may include application circuitry 703, baseband circuitry 705, radio frequency (RF) circuitry 707, front-end module (FEM) circuitry 709, and one or more antennas 714, coupled together at least as shown in FIG. 7. Any combination or subset of these components can be included, for example, in a UE device or an eNodeB device.

The application circuitry 703 may include one or more application processors. By way of non-limiting example, the application circuitry 703 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 705 may include one or more single-core or multi-core processors. The baseband circuitry 705 may include one or more baseband processors and/or control logic. The baseband circuitry 705 may be configured to process baseband signals received from a receive signal path of the RF circuitry 707. The baseband circuitry 705 may also be configured to generate baseband signals for a transmit signal path of the RF circuitry 707. The baseband circuitry 705 may interface with the application circuitry 703 for generation and processing of the baseband signals, and for controlling operations of the RF circuitry 707.

By way of non-limiting example, the baseband circuitry 705 may include at least one of a second generation (2G) baseband processor 711A, a third generation (3G) baseband processor 711B, a fourth generation (4G) baseband processor 711C, and other baseband processor(s) 711D for other existing generations and generations in development or to be developed in the future (e.g., fifth generation (5G), sixth generation (6G), etc.). The baseband circuitry 705 (e.g., at least one of the baseband processors 711A-711D) may handle various radio control functions that enable communication with one or more radio networks via the RF circuitry 707. By way of non-limiting example, the radio control functions may include signal modulation/demodulation, encoding/decoding, radio frequency shifting, other functions, and combinations thereof. In some embodiments, modulation/demodulation circuitry of the baseband circuitry 705 may be programmed to perform Fast-Fourier Transform (FFT), precoding, and constellation mapping/demapping functions, other functions, and combinations thereof. In some embodiments, encoding/decoding circuitry of the baseband circuitry 705 may be programmed to perform convolutions, tail-biting convolutions, turbo, Viterbi, and Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 705 may include elements of a protocol stack. By way of non-limiting example, elements of an evolved universal terrestrial radio access network (EUTRAN) protocol include, for example, physical (PHY), media access control (MAC), radio link control (RLC), packet data convergence protocol (PDCP), and/or radio resource control (RRC) elements. A central processing unit (CPU) 711E of the baseband circuitry 705 may be programmed to run elements of the protocol stack for signaling of the PHY, MAC, RLC, PDCP and/or RRC layers. In some embodiments, the baseband circuitry 705 may include one or more audio digital signal processor(s) (DSP) 711F. The audio DSP(s) 711F may include elements for compression/decompression and echo cancellation. The audio DSP(s) 711F may also include other suitable processing elements.

The baseband circuitry 705 may further include a memory/storage 711G. The memory/storage 711G may include data and/or instructions for operations performed by the processors of the baseband circuitry 705 stored thereon. In some embodiments, the memory/storage 711G may include any combination of suitable volatile memory and/or non-volatile memory. The memory/storage 711G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 711G may be shared among the various processors or dedicated to particular processors.

Components of the baseband circuitry 705 may be suitably combined in a single chip or a single chipset, or disposed on a same circuit board in some embodiments. In some embodiments, some or all of the constituent components of the baseband circuitry 705 and the application circuitry 703 may be implemented together, such as, for example, on a system on a chip (SOC).

In some embodiments, the baseband circuitry 705 may provide for communication compatible with one or more radio technologies. For example, in some embodiments, the baseband circuitry 705 may support communication with an evolved universal terrestrial radio access network (EUTRAN) and/or other wireless metropolitan area networks (WMAN), a wireless local area network (WLAN), or a wireless personal area network (WPAN). Embodiments in which the baseband circuitry 705 is configured to support radio communications of more than one wireless protocol may be referred to as multi-mode baseband circuitry.

The RF circuitry 707 may enable communication with wireless networks using modulated electromagnetic radiation through a non-solid medium. In various embodiments, the RF circuitry 707 may include switches, filters, amplifiers, etc. to facilitate the communication with the wireless network. The RF circuitry 707 may include a receive signal path, which may include circuitry to down-convert RF signals received from the FEM circuitry 709, and provide baseband signals to the baseband circuitry 705. The RF circuitry 707 may also include a transmit signal path, which may include circuitry to up-convert baseband signals provided by the baseband circuitry 705, and provide RF output signals to the FEM circuitry 709 for transmission.

In some embodiments, the RF circuitry 707 may include a receive signal path and a transmit signal path. The receive signal path of the RF circuitry 707 may include a mixer circuitry 713A, an amplifier circuitry 713B, and a filter circuitry 713C. The transmit signal path of the RF circuitry 707 may include the filter circuitry 713C and the mixer circuitry 713A. The RF circuitry 707 may further include a synthesizer circuitry 713D configured to synthesize a frequency for use by the mixer circuitry 713A of the receive signal path and the transmit signal path. In some embodiments, the mixer circuitry 713A of the receive signal path may be configured to down-convert RF signals received from the FEM circuitry 709 based on the synthesized frequency provided by the synthesizer circuitry 713D. The amplifier circuitry 713B may be configured to amplify the down-converted signals.

The filter circuitry 713C may include a low-pass filter (LPF) or band-pass filter (BPF) configured to remove unwanted signals from the down-converted signals to generate output baseband signals. Output baseband signals may be provided to the baseband circuitry 705 for further processing. In some embodiments, the output baseband signals may include zero-frequency baseband signals, although this is not a requirement. In some embodiments, the mixer circuitry 713A of the receive signal path may comprise passive mixers, although the scope of the embodiments is not limited in this respect.

In some embodiments, the mixer circuitry 713A of the transmit signal path may be configured to up-convert input baseband signals based on the synthesized frequency provided by the synthesizer circuitry 713D to generate RF output signals for the FEM circuitry 709. The baseband signals may be provided by the baseband circuitry 705 and may be filtered by the filter circuitry 713C. The filter circuitry 713C may include a low-pass filter (LPF), although the scope of the embodiments is not limited in this respect.

In some embodiments, the mixer circuitry 713A of the receive signal path and the mixer circuitry 713A of the transmit signal path may include two or more mixers, and may be arranged for quadrature downconversion and/or upconversion, respectively. In some embodiments, the mixer circuitry 713A of the receive signal path and the mixer circuitry 713A of the transmit signal path may include two or more mixers and may be arranged for image rejection (e.g., Hartley image rejection). In some embodiments, the mixer circuitry 713A of the receive signal path and the mixer circuitry 713A of the transmit signal path may be arranged for direct downconversion and/or direct upconversion, respectively. In some embodiments, the mixer circuitry 713A of the receive signal path and the mixer circuitry 713A of the transmit signal path may be configured for superheterodyne operation.

In some embodiments, the output baseband signals and the input baseband signals may be analog baseband signals, although the scope of the embodiments is not limited in this respect. In some alternative embodiments, the output baseband signals and the input baseband signals may be digital baseband signals. In such embodiments, the RF circuitry 707 may include analog-to-digital converter (ADC) and digital-to-analog converter (DAC) circuitry, and the baseband circuitry 705 may include a digital baseband interface to communicate with the RF circuitry 707.

In some dual-mode embodiments, separate radio IC circuitry may be provided for processing signals for each spectrum, although the scope of the embodiments is not limited in this respect.

In some embodiments, the synthesizer circuitry 713D may include one or more of a fractional-N synthesizer and a fractional N/N+1 synthesizer, although the scope of the embodiments is not limited in this respect, as other types of frequency synthesizers may be suitable. For example, the synthesizer circuitry 713D may include a delta-sigma synthesizer, a frequency multiplier, a synthesizer comprising a phase-locked loop with a frequency divider, other synthesizers, and combinations thereof.

The synthesizer circuitry 713D may be configured to synthesize an output frequency for use by the mixer circuitry 713A of the RF circuitry 707 based on a frequency input and a divider control input. In some embodiments, the synthesizer circuitry 713D may be a fractional N/N+1 synthesizer.

In some embodiments, frequency input may be provided by a voltage controlled oscillator (VCO), although that is not a requirement. Divider control input may be provided by either the baseband circuitry 705 or the application circuitry 703 depending on the desired output frequency. In some embodiments, a divider control input (e.g., N) may be determined from a look-up table based on a channel indicated by the application circuitry 703.

The synthesizer circuitry 713D of the RF circuitry 707 may include a divider, a delay-locked loop (DLL), a multiplexer and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry-out) to provide a fractional division ratio. In some example embodiments, the DLL may include a set of cascaded, tunable, delay elements; a phase detector; a charge pump; and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 713D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be an LO frequency (fLO). In some embodiments, the RF circuitry 707 may include an IQ/polar converter.

The FEM circuitry 709 may include a receive signal path, which may include circuitry configured to operate on RF signals received from the one or more antennas 714, amplify the received signals, and provide the amplified versions of the received signals to the RF circuitry 707 for further processing. The FEM circuitry 709 may also include a transmit signal path, which may include circuitry configured to amplify signals for transmission provided by the RF circuitry 707 for transmission by at least one of the one or more antennas 714.

In some embodiments, the FEM circuitry 709 may include a TX/RX switch configured to switch between a transmit mode and a receive mode operation. The FEM circuitry 709 may include a receive signal path and a transmit signal path. The receive signal path of the FEM circuitry 709 may include a low-noise amplifier (LNA) to amplify received RF signals and provide the amplified received RF signals as an output (e.g., to the RF circuitry 707). The transmit signal path of the FEM circuitry 709 may include a power amplifier (PA) configured to amplify input RF signals (e.g., provided by the RF circuitry 707), and one or more filters configured to generate RF signals for subsequent transmission (e.g., by one or more of the one or more antennas 714).

In some embodiments, the device may include additional elements such as, for example, memory/storage, a display, a camera, one or more sensors, an input/output (I/O) interface, other elements, and combinations thereof.

In some embodiments, the device may be configured to perform one or more processes, techniques, and/or methods as described herein, or portions thereof.

Figure 8:
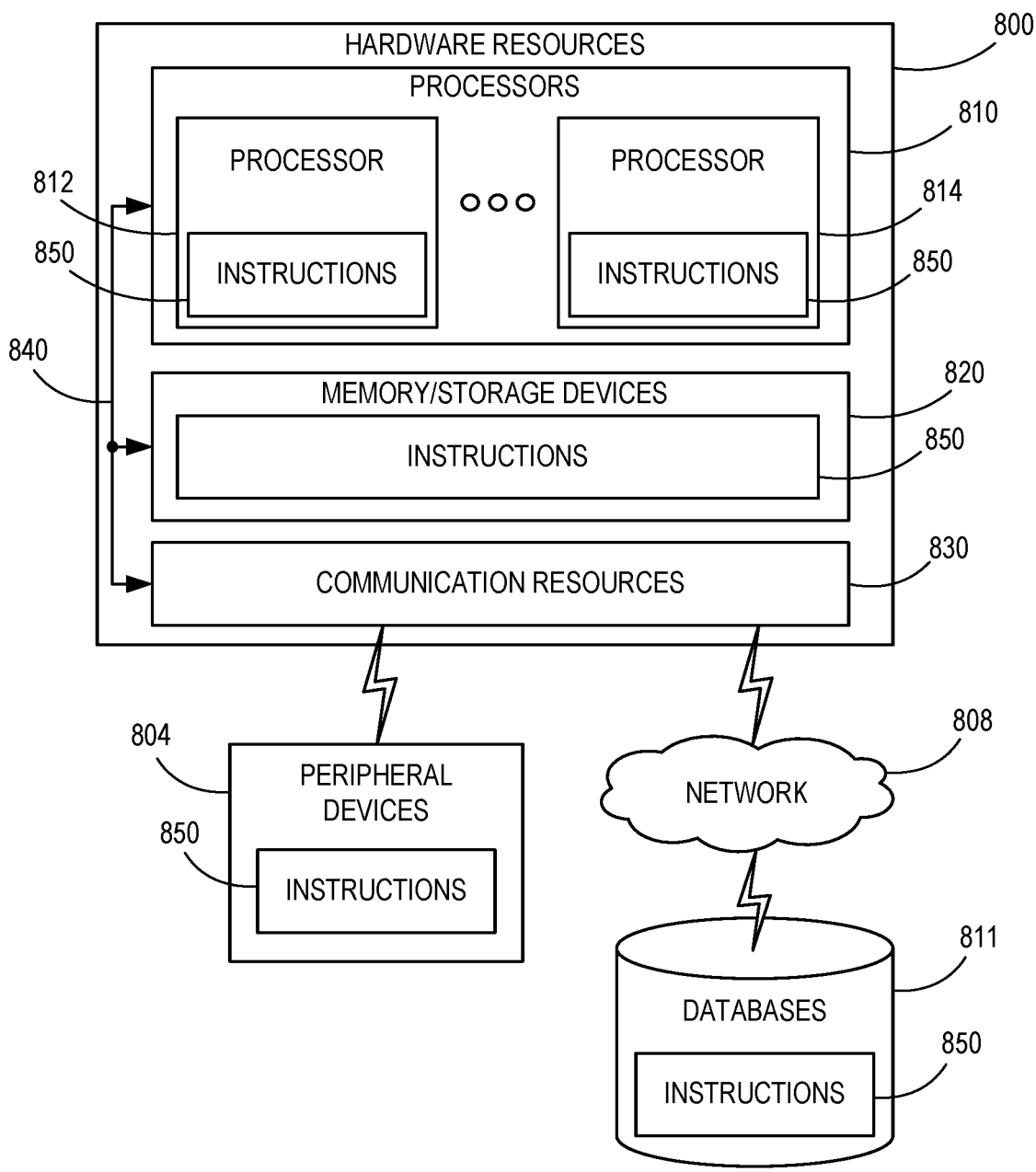
FIG. 8 is a block diagram illustrating components according to some embodiments.

FIG. 8 is a block diagram illustrating components, according to some example embodiments, able to read instructions from a machine-readable or computer-readable medium (e.g., a machine-readable storage medium) and perform any one or more of the methodologies discussed herein. Specifically, FIG. 8 shows a diagrammatic representation of hardware resources 800 including one or more processors (or processor cores) 810, one or more memory/storage devices 820, and one or more communication resources 830, which are communicatively coupled via a bus 840.

The processors 810 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 812 and a processor 814. The memory/storage devices 820 may include main memory, disk storage, or any suitable combination thereof.

The communication resources 830 may include interconnection and/or network interface components or other suitable devices to communicate with one or more peripheral devices 804 and/or one or more databases 811 via a network 808. For example, the communication resources 830 may include wired communication components (e.g., for coupling via a Universal Serial Bus (USB)), cellular communication components, Near Field Communication (NFC) components, Bluetooth® components (e.g., Bluetooth® Low Energy), Wi-Fi® components, and other communication components.

Instructions 850 may comprise software, a program, an application, an applet, an app, or other executable code for causing at least one of the processors 810 to perform any one or more of the methodologies discussed herein. The instructions 850 may reside, completely or partially, within at least one of the processors 810 (e.g., within the processor's cache memory), the memory/storage devices 820, or any suitable combination thereof. Furthermore, any portion of the instructions 850 may be transferred to the hardware resources 800 from any combination of the peripheral devices 804 and/or the databases 811. Accordingly, the memory of the processors 810, the memory/storage devices 820, the peripheral devices 804, and the databases 811 are examples of computer-readable and machine-readable media.

EXAMPLE EMBODIMENTS

Example 1 is an apparatus for a user equipment (UE) operating in an unlicensed spectrum. The apparatus includes an electronic memory to store a scheduling request (SR) message. The apparatus also includes one or more baseband processors designed to process a physical downlink control channel (PDCCH) transmission provided by an evolved node B (eNodeB) to identify a resource for a transmission of the SR message, and based on the resource identified in the PDCCH, generate a physical uplink control channel (PUCCH) transmission including the SR message for the eNodeB.

Example 2 is the apparatus of Example 1, where the one or more processors designed to process the PDCCH transmission are further designed to process a physical downlink control channel scrambled by CC-RNTI (cPDCCH).

Example 3 is the apparatus of Example 1, where the PUCCH transmission spans 4 symbols spanning one of the interlaces of block-interleaved frequency division multiple access (B-IFDMA) structure.

Example 4 is the apparatus of Example 1, where the one or more processors designed to generate the PUCCH transmission are further designed to generate a short PUCCH (sPUCCH) transmission.

Example 5 is the apparatus of Example 4, where the sPUCCH transmission is time multiplexed with a PUSCH transmission.

Example 6 is an apparatus for an evolved node B (eNodeB) operating in an unlicensed spectrum. The apparatus includes and electronic memory to store a scheduling request (SR) message. The apparatus includes one or more baseband processors designed to design, using higher layer signaling, an SR resource for a transmission of the SR message on a short physical uplink control channel (sPUCCH), encode a physical downlink control channel (PDCCH) scrambled by a CC radio network temporary identifier (CC-RNTI) transmission indicating the SR resource, and process the sPUCCH from a user equipment (UE) to determine an uplink schedule for the UE based on the SR message.

Example 7 is the apparatus of Example 6, where the one or more baseband processors are further designed to design the SR resource including a burst identification (ID).

Example 8 is the apparatus of Example 6, where the one or more baseband processors are further designed to design the SR resource including an uplink (UL) subframe offset.

Example 9 is the apparatus of Example 8, where the UL subframe offset is designed by a radio resource control (RRC) configuration.

Example 10 is the apparatus of Example 8, where the UL subframe offset is designed by a physical downlink control channel scrambled by CC-RNTI (cPDCCH).

Example 11 is the apparatus of Example 6, where the one or more baseband processors are further designed to design the SR resource including a burst ID and an UL subframe offset.

Example 12 is the apparatus of Example 6, where the SR resource is generated by an RRC layer.

Example 13 is a computer-readable storage medium having stored thereon instructions that, when implemented by a user equipment (UE), cause the UE to generate a scheduling request (SR) message, perform a listen before talk (LBT) procedure on a non-anchored subframe, and encode a physical random access channel (PRACH) transmission including the SR message for a transmission of the SR message in response to a successful completion of the LBT procedure. The computer-readable storage medium having stored thereon instructions that, when implemented by a user equipment (UE), cause the UE to process a physical downlink control channel scrambled by CC-RNTI (cPDCCH) transmission including a schedule for a transmission of an uplink transmission, and encode the uplink transmission based on the schedule.

Example 14 is the computer-readable storage medium of Example 13, where the instructions designed to perform the LBT procedure are further designed to perform the LBT procedure repetitively until the successful completion of the LBT procedure.

Example 15 is the computer-readable storage medium of Example 13, where the instructions designed to perform the LBT procedure further include instructions to perform a category (CAT) 4 LBT procedure on non-anchor subframe.

Example 16 is the computer-readable storage medium of Example 13, where the instructions designed to perform the LBT procedure further include instructions to perform a one shot LBT procedure when cPDCCH is detected, and the LBT procedure is designed to be the one shot LBT procedure by a higher layer.

Example 17 is the computer-readable storage medium of Example 13, where the instructions designed to perform the LBT procedure further include instructions to perform a no LBT procedure when cPDCCH is detected, and the LBT procedure is designed to be no LBT procedure by a higher layer followed by 16 us DL/UL gap.

Example 18 is the computer-readable storage medium of Example 17, where the instructions designed to encode the PRACH transmission including the SR message for the transmission of the SR message in response to the successful completion of the LBT procedure further include instructions to encode the PRACH transmission including the SR message for the transmission of the SR message in response to the successful completion of one shot LBT procedure.

Example 19 is the computer-readable storage medium of Example 17, where the uplink transmission is provided via a short physical uplink control channel (sPUCCH) for SR transmissions.

Example 20 is a method for operating a user equipment (UE) in an unlicensed spectrum. The method includes storing a scheduling request (SR) message, processing a physical downlink control channel (PDCCH) transmission provided by an evolved node B (eNodeB) to identify a resource for a transmission of the SR message, and based on the resource identified in the PDCCH, generating a physical uplink control channel (PUCCH) transmission including the SR message for the eNodeB.

Example 21 is the method of Example 20, where processing the PDCCH transmission further includes processing a physical downlink control channel scrambled by CC-RNTI (cPDCCH).

Example 22 is the method of Example 20, where the PUCCH transmission spans 4 symbols spanning one of the interlaces of block-interleaved frequency division multiple access (B-IFDMA) structure.

Example 23 is the method of Example 20, where generating the PUCCH transmission further includes generating a short PUCCH (sPUCCH) transmission.

Example 24 is the method of Example 23, where the sPUCCH transmission is time multiplexed with a PUSCH transmission.

Example 25 is a method for operating an evolved node B (eNodeB) in an unlicensed spectrum. The method includes designing, using higher layer signaling, an SR resource for a transmission of a scheduling request (SR) message on a short physical uplink control channel (sPUCCH). The method also includes encoding a physical downlink control channel (PDCCH) scrambled by a CC radio network temporary identifier (CC-RNTI) transmission indicating the SR resource, and processing the sPUCCH from a user equipment (UE) to determine an uplink schedule for the UE based on the SR message.

Example 26 is the method of Example 25, further including designing the SR resource including a burst identification (ID).

Example 27 is the method of Example 25, further including designing the SR resource including an uplink (UL) subframe offset.

Example 28 is the method of Example 27, where the UL subframe offset is designed by a radio resource control (RRC) configuration.

Example 29 is the method of Example 27, where the UL subframe offset is designed by a physical downlink control channel scrambled by CC-RNTI (cPDCCH).

Example 30 is the method of Example 25, further including designing the SR resource including a burst ID and an UL subframe offset.

Example 31 is the method of Example 25, where the SR resource is generated by an RRC layer.

Example 32 is a method for operating a user equipment (UE) in an unlicensed spectrum. The method includes generating a scheduling request (SR) message, performing a listen before talk (LBT) procedure on a non-anchored subframe, and encoding a physical random access channel (PRACH) transmission including the SR message for a transmission of the SR message in response to a successful completion of the LBT procedure. The method also includes processing a physical downlink control channel scrambled by CC-RNTI (cPDCCH) transmission including a schedule for a transmission of an uplink transmission, and encoding the uplink transmission based on the schedule.

Example 33 is the method of Example 32, where performing the LBT procedure further includes performing the LBT procedure repetitively until the successful completion of the LBT procedure.

Example 34 is the method of Example 32, where performing the LBT procedure further includes performing a category (CAT) 4 LBT procedure on non-anchor subframe.

Example 35 is the method of Example 32, where performing the LBT procedure further includes performing a one shot LBT procedure when cPDCCH is detected, and the LBT procedure is designed to be the one shot LBT procedure by a higher layer.

Example 36 is the method of Example 32, where performing the LBT procedure further includes performing a no LBT procedure when cPDCCH is detected, and the LBT procedure is designed to be the no LBT procedure by a higher layer followed by 16 us DL/UL gap.

Example 37 is the method of Example 36, where encoding the PRACH transmission including the SR message for the transmission of the SR message in response to the successful completion of the LBT procedure further includes encoding the PRACH transmission including the SR message for the transmission of the SR message in response to the successful completion of one shot LBT procedure.

Example 38 is the method of Example 36, where the uplink transmission is provided via a short physical uplink control channel (sPUCCH) for SR transmissions.

Example 39 is at least one computer-readable storage medium having stored thereon computer-readable instructions, when executed, to implement a method as exemplified in any of Examples 20-38.

Example 40 is an apparatus including a manner to perform a method as exemplified in any of Examples 20-38.

Example 41 is a manner for performing a method as exemplified in any of Examples 20-38.

Various techniques, or certain aspects or portions thereof, may take the form of program code (i.e., instructions) embodied in tangible media, such as floppy diskettes, CD-ROMs, hard drives, a non-transitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNodeB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations of embodiments.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the embodiments are not to be limited to the details given herein, but may be modified within the scope and equivalents of the appended claims.

The invention claimed is:

1. A user equipment (UE), comprising:
one or more baseband processors configured to:
generate a scheduling request (SR) message;
perform a listen before talk (LBT) procedure on a non-anchored subframe, wherein the non-anchored subframe is a subframe that is not anchored respective to a carrier in a licensed spectrum;
encode a physical random access channel (PRACH) transmission comprising the SR message for a transmission of the SR message in the non-anchored subframe in response to a successful completion of the LBT procedure; and
process a physical downlink control channel (PDCCH) transmission received at the UE in response to the transmission of the SR, the PDCCH comprising a schedule for a transmission of an uplink transmission; and
a transmitter to transmit the uplink transmission based on the schedule.

2. The UE of claim 1, wherein the one or more baseband processors are further configured to perform the LBT procedure repetitively until the successful completion of the LBT procedure.

3. The UE of claim 1, wherein the one or more baseband processors are further configured to perform a category (CAT) 4 LBT procedure on the non-anchored subframe.

4. The UE of claim 1, wherein the one or more baseband processors are further configured to perform a one shot LBT procedure when the PDCCH transmission is detected, and the LBT procedure is configured to be the one shot LBT procedure by a higher layer.

5. The UE of claim 1, wherein the one or more baseband processors are further configured to perform a no LBT procedure when the PDCCH transmission is detected, and the LBT procedure is configured to be the no LBT procedure by a higher layer followed by a 16 μs downlink/uplink (DL/UL) gap.

6. The UE of claim 5, wherein the one or more baseband processors are further configured to encode the PRACH transmission comprising the SR message for the transmission of the SR message in response to the successful completion of a one shot LBT procedure.

7. A non-transitory computer-readable storage medium having stored thereon instructions that, when implemented by a user equipment (UE), cause the UE to:
generate a scheduling request (SR) message;
perform a listen before talk (LBT) procedure on a non-anchored subframe, wherein the non-anchored subframe is a subframe that is not anchored respective to a carrier in a licensed spectrum;
encode a physical random access channel (PRACH) transmission comprising the SR message for a transmission of the SR message in the non-anchored subframe in response to a successful completion of the LBT procedure;
process a physical downlink control channel (PDCCH) transmission received at the UE in response to the transmission of the SR, the PDCCH comprising a schedule for a transmission of an uplink transmission; and
encode the uplink transmission based on the schedule.

8. The non-transitory computer-readable storage medium of claim 7, wherein the instructions configured to perform the LBT procedure are further configured to perform the LBT procedure repetitively until the successful completion of the LBT procedure.

9. The non-transitory computer-readable storage medium of claim 7, wherein the instructions configured to perform the LBT procedure further comprise instructions to perform a category (CAT) 4 LBT procedure on the non-anchored subframe.

10. The non-transitory computer-readable storage medium of claim 7, wherein the instructions configured to perform the LBT procedure further comprise instructions to perform a one shot LBT procedure when the PDCCH transmission is detected, and the LBT procedure is configured to be the one shot LBT procedure by a higher layer.

11. The non-transitory computer-readable storage medium of claim 7, wherein the instructions configured to perform the LBT procedure further comprise instructions to perform a no LBT procedure when the PDCCH transmission is detected, and the LBT procedure is configured to be the no LBT procedure by a higher layer followed by a 16 μs downlink/uplink (DL/UL) gap.

12. The non-transitory computer-readable storage medium of claim 11, wherein the instructions configured to encode the PRACH transmission comprising the SR message for the transmission of the SR message in response to the successful completion of the LBT procedure further comprise instructions to encode the PRACH transmission comprising the SR message for the transmission of the SR message in response to the successful completion of a one shot LBT procedure.

13. The non-transitory computer-readable storage medium of claim 11, wherein the uplink transmission is provided via a short physical uplink control channel for SR transmissions.

14. A method for a user equipment (UE), the method comprising:
- generating a scheduling request (SR) message;
- performing a listen before talk (LBT) procedure on a non-anchored subframe, wherein the non-anchored subframe is a subframe that is not anchored respective to a carrier in a licensed spectrum;
- encoding a physical random access channel (PRACH) transmission comprising the SR message for a transmission of the SR message in the non-anchored subframe in response to a successful completion of the LBT procedure;
- processing a physical downlink control channel (PDCCH) transmission received at the UE in response to the transmission of the SR, the PDCCH comprising a schedule for a transmission of an uplink transmission; and
- transmitting the uplink transmission based on the schedule.

15. The method of claim 14, wherein performing the LBT procedure further comprises performing the LBT procedure repetitively until the successful completion of the LBT procedure.

16. The method of claim 14, wherein performing the LBT procedure further comprises performing a category (CAT) 4 LBT procedure on the non-anchored subframe.

17. The method of claim 14, wherein performing the LBT procedure further comprises performing a one shot LBT procedure when the PDCCH transmission is detected, and the LBT procedure is configured to be the one shot LBT procedure by a higher layer.

18. The method of claim 14, wherein performing the LBT procedure further comprises performing a no LBT procedure when the PDCCH transmission is detected, and the LBT procedure is configured to be the no LBT procedure by a higher layer followed by a 16 μs downlink/uplink (DL/UL) gap.

19. The method of claim 18, wherein encoding the PRACH transmission comprising the SR message for the transmission of the SR message in response to the successful completion of the LBT procedure further comprises encoding the PRACH transmission comprising the SR message for the transmission of the SR message in response to the successful completion of a one shot LBT procedure.

20. The method of claim 18, wherein the uplink transmission is provided via a short physical uplink control channel for SR transmissions.

* * * * *